(12) United States Patent
Kang

(10) Patent No.: US 9,954,368 B2
(45) Date of Patent: Apr. 24, 2018

(54) BATTERY ENERGY STORAGE SYSTEM MANAGEMENT DEVICE AND METHOD

(71) Applicant: LSIS CO., LTD., Anyang-si, Gyeonggi-do (KR)

(72) Inventor: Byung Kwan Kang, Seoul (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 197 days.

(21) Appl. No.: 14/986,097

(22) Filed: Dec. 31, 2015

(65) Prior Publication Data

US 2016/0233699 A1  Aug. 11, 2016

(30) Foreign Application Priority Data

Feb. 11, 2015  (KR) ................. 10-2015-0021007

(51) Int. Cl.
| | |
|---|---|
| H02J 7/00 | (2006.01) |
| H02J 3/32 | (2006.01) |
| H02J 3/38 | (2006.01) |
| H02J 7/35 | (2006.01) |
| H02J 7/04 | (2006.01) |

(52) U.S. Cl.
CPC ............... *H02J 3/32* (2013.01); *H02J 3/383* (2013.01); *H02J 7/35* (2013.01); *H02J 7/0077* (2013.01); *H02J 7/042* (2013.01); *Y02E 10/563* (2013.01); *Y02E 10/566* (2013.01); *Y02E 40/10* (2013.01); *Y02E 70/30* (2013.01)

(58) Field of Classification Search
CPC . H02J 7/0054; H02J 3/32; H02J 3/383; Y10T 307/615; Y10T 307/625
USPC ..... 320/101, 116–119, 134, 136; 307/44–46, 307/64–66
See application file for complete search history.

(56) References Cited

U.S. PATENT DOCUMENTS

| | | | |
|---|---|---|---|
| 8,054,034 B2 | 11/2011 | Lim et al. | |
| 2002/0192519 A1* | 12/2002 | Fujita | B60L 11/1887 429/432 |
| 2013/0049698 A1* | 2/2013 | Jung | H02J 7/0016 320/134 |

FOREIGN PATENT DOCUMENTS

| | | |
|---|---|---|
| CN | 103036243 A | 4/2013 |
| CN | 104333068 A | 2/2015 |
| JP | 2008522579 | 6/2008 |
| JP | 2009055687 | 3/2009 |

(Continued)

OTHER PUBLICATIONS

Japan Patent Office Application No. 2015-249533, Office Action dated Mar. 7, 2017, 3 pages.

(Continued)

*Primary Examiner* — Drew A Dunn
*Assistant Examiner* — Zixuan Zhou
(74) *Attorney, Agent, or Firm* — K&L Gates LLP

(57) ABSTRACT

Provided is a Battery Energy Storage System (BESS) management device for managing a BESS for receiving and charging electrical energy and supplying the electrical energy to a DC/AC converter by discharging the charged electrical energy in a power supply system. The BESS management device includes a measurement unit configured to measure State of Charges (SOCs) of a plurality of series-connected modules or cells in the BESS and a DC power supply unit configured to supply DC power to one of the plurality of modules or one of the plurality of cells on the basis of the SOCs of the plurality of modules or cells.

17 Claims, 6 Drawing Sheets

(56) References Cited

FOREIGN PATENT DOCUMENTS

| | | |
|---|---|---|
| JP | 2011130655 | 6/2011 |
| JP | 2012023802 | 2/2012 |
| KR | 10-2012-0011363 | 2/2012 |
| KR | 10-2012-0080125 | 7/2012 |
| KR | 10-1165593 | 7/2012 |
| KR | 10-2013-0054766 | 5/2013 |
| KR | 10-1318891 | 10/2013 |
| KR | 10-2014-0072965 | 6/2014 |
| WO | 2006068429 | 6/2006 |

OTHER PUBLICATIONS

Korean Intellectual Property Office Application Serial No. 10-2015-0021007, Notice of Allowance dated Apr. 25, 2016, 19 pages.
Korean Intellectual Property Office Application Serial No. 10-2015-0021007, Office Action dated Oct. 19, 2015, 6 pages.
Japan Patent Office Application Serial No. 2015-249533, Office Action dated Nov. 22, 2016, 2 pages.
Chinese Office Action for related Chinese Application No. 201610066955.6; action dated Nov. 29, 2017; (6 pages).

* cited by examiner

BATTERY ENERGY STORAGE SYSTEM MANAGEMENT DEVICE AND METHOD

CROSS-REFERENCE TO RELATED APPLICATIONS

Pursuant to 35 U.S.C. § 119(a), this application claims the benefit of earlier filing date and right of priority to Korean Patent Application No. 10-2015-0021007, filed on Feb. 11, 2015, the contents of which are all hereby incorporated by reference herein in its entirety.

BACKGROUND

The present disclosure relates to a power supply system including a Battery Energy Storage System (BESS).

Since electrical energy is easily transferred and converted, it is widely used. In order to use such electrical energy efficiently, a BESS is used. The BESS receive power and is charged. Additionally, when power is required, the BESS supplies the power by discharging charged power. Through this, the BESS supplies power flexibly.

In detail, when an electricity generation system includes a BESS, it operates as follows. When a load or a system is overloaded, the BESS discharges stored electrical energy. Additionally, when a load or a system is lightly loaded, the BESS receive power from an electricity generation device or system and is changed.

Additionally, if the BESS exists independently regardless of an electricity generation system, the BESS receives idle power from an external power supply source and is charged. Additionally, when a system or a load is overloaded, the BESS supplies power by discharging charged power.

The BESS includes a plurality of battery racks connected in parallel. The battery rack includes a plurality of modules connected in series. Each of the plurality of modules includes a plurality of cells connected in series. A charging state of each of the plurality of modules varies according to charging and discharging of a battery energy system. As a charging state of each of the plurality of modules varies, the efficiency of power supplied by the BESS is reduced. Accordingly, an electricity generation system for managing the BESS efficiently is required.

SUMMARY

Embodiments provide a BESS management device and method for managing a BESS used in a power supply system.

In one embodiment, Provided is a Battery Energy Storage System (BESS) management device for managing a BESS for receiving and charging electrical energy and supplying the electrical energy to a DC/AC converter by discharging the charged electrical energy in a power supply system. The BESS management device includes: a measurement unit configured to measure State of Charges (SOCs) of a plurality of series-connected modules or cells in the BESS; and a DC power supply unit configured to supply DC power to one of the plurality of modules or one of the plurality of cells on the basis of the SOCs of the plurality of modules or cells.

The DC power supply unit may supply DC power for operations of a configuration of the power supply system.

The DC power supply unit may supply DC power to one of the plurality of modules or one of the plurality of cells when the power supply system does not operate.

The DC power supply unit may be a Switching Mode Power Supply (SMPS).

The DC power supply unit may be an Uninterruptible Power Supply for preventing an operation interruption of the power supply system during outage.

The DC power supply unit may supply DC power when a SOC of one of the plurality of modules or one of the plurality of cells shows a difference of more than a reference range with respect to a SOC of another module or another cell.

The measurement unit may include a voltage measurement unit for measuring a voltage of the plurality of cells or the plurality of modules.

The measurement unit may include a current measurement unit for measuring a current of the plurality of cells or the plurality of modules.

The BESS management device may further include a DC/DC converter installed between the DC power supply unit and the BESS to convert a size of DC power supplied from the DC power supply unit.

The DC/DC converter may supply the size converted DC power to the BESS.

In another embodiment, provided is a BESS management method for management a BESS for receiving and charging electrical energy and discharging the charged electrical energy in a power supply system. The method includes: measuring State of Charges (SOCs) of a plurality of series-connected modules or cells in the BESS; and supplying DC power to one of the plurality of modules or one of the plurality of cells on the basis of the SOCs of the plurality of modules or cells.

The supplying of the DC power may include supplying DC power for operations of a configuration of the power supply system.

The supplying of the DC power may include supplying DC power to one of the plurality of modules or one of the plurality of cells when the power supply system does not operate.

The supplying of the DC power may include supplying DC power by a Switching Mode Power Supply (SMPS).

The supplying of the DC power may include supplying DC power by an Uninterruptible Power Supply for preventing an operation interruption of the power supply system during outage.

The supplying of the DC power may include supplying DC power when a SOC of one of the plurality of modules or one of the plurality of cells shows a difference of more than a reference range with respect to a SOC of another module or another cell.

The measuring of the SOCs may include measuring a voltage of the plurality of cells or the plurality of modules.

The measuring of the SOCs may include measuring a current of the plurality of cells or the plurality of modules.

The method may further include supplying a size converted DC power to the BESS by a DC/DC converter for converting a size of a DC power supplied from the DC power supply unit.

The details of one or more embodiments are set forth in the accompanying drawings and the description below. Other features will be apparent from the description and drawings, and from the claims.

DETAILED DESCRIPTION OF THE EMBODIMENTS

Figure 1:
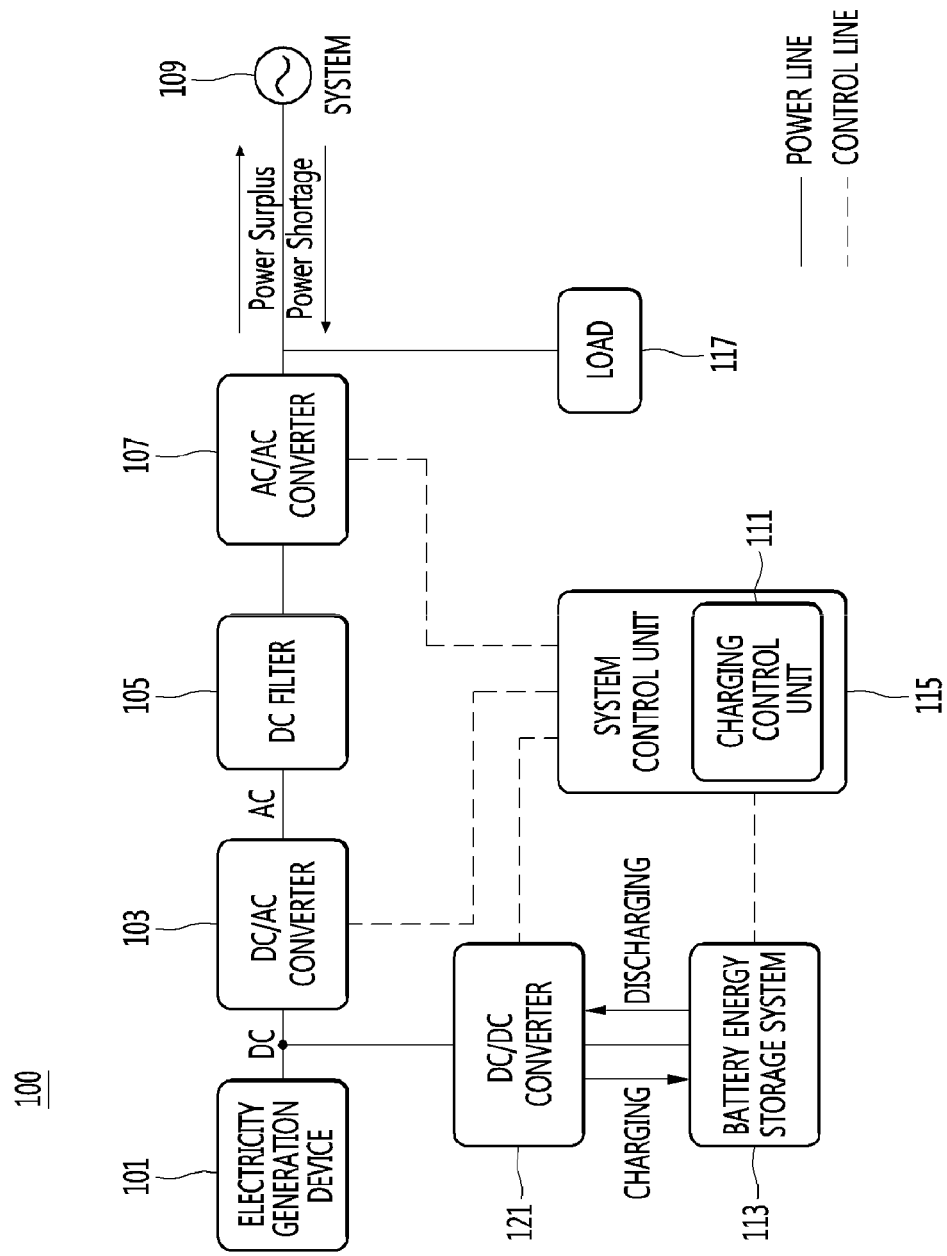
FIG. 1 is a block diagram illustrating a power supply system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

Hereinafter, a power supply system according to an embodiment of the present invention is described with reference to FIGS. 1 to 4.

FIG. 1 is a block diagram illustrating a power supply system according to an embodiment of the present invention.

A power supply system 100 according to an embodiment of the present invention includes an electricity generation device 101, a DC/AC converter 103, an AC filter 105, an AC/AC converter 107, a system 109, a charging control unit 111, a Battery Energy Storage System (BESS) 113, a system control unit 115, a load 117, and an DC/DC converter 121.

The electricity generation device 101 generates electrical energy. If the electricity generation device 101 is a photovoltaic device, it may be a solar cell array. The solar cell array combines a plurality of solar cell modules. The solar cell module is a device for generating a predetermined voltage and current by converting solar energy into electrical energy as connecting a plurality of solar cells in serial or parallel. Accordingly, the solar cell array absorbs solar energy and converts it into electrical energy. Additionally, when an electricity generation system is a wind power generation system, the electricity generation device 101 may be a fan for converting wind power energy into electrical energy. However, as mentioned above, the power supply system 100 may supply power through only the BESS 113 without the electricity generation device 101. In this case, the power supply system 100 may not include the electricity generation device 101.

The DC/AC inverter 103 inverts DC power into AC power. DC power supplied by the electricity generation device 101 or DC power discharged by the BESS 113 is converted into AC power.

The AC filter 105 filters the noise of power converted into AC power. According to a specific embodiment of the present invention, the AC filter 105 may be omitted.

The AC/AC converter 107 converts the voltage size of AC power where noise is filtered and supplies power to the system 109 or an independent load, in order to supply AC power to the system 109 or the load 117. According to a specific embodiment of the present invention, the AC/AC converter 107 may be omitted.

The system 109 is a system where many power plants, substations, transmission and distribution lines, and loads are integrated to generate and use power.

The load 117 consumes power by receiving electrical energy from an electricity generation system. The BESS 113 receives electronic energy from the electricity generation device 101 and performs charging, or discharge the charged electrical energy according to a power supply situation of the system 109 or the load 117. In more detail, when the system 109 or the load 117 is lightly loaded, the BESS 113 receives idle power from the electricity generation device 101 and performs charging. When the system 109 or the load 117 is overloaded, the BESS 113 discharges the charged power to supply it to the system 109 or the load 117. A power supply situation of the system 109 or the load 117 may have a great difference for each time slot. Accordingly, it is inefficient for the power supply system 100 to supply power supplied by the electricity generation device 101 uniformly without consideration on a power supply situation of the system 109 or the load 117. Therefore, the power supply system 100 adjusts the amount of power supply according to a power supply situation of the system 109 or the load 117 by using the BESS 113. Through this, the power supply system 100 may efficiently supply power to the system 109 or the load 117.

The DC/DC converter 121 converts the size of DC power supplied or received by the BESS 113. According to a specific embodiment of the present invention, the DC/DC converter 121 may be omitted.

The system control unit 115 controls operations of the DC/AC converter 103 and the DC/DC converter 107. Additionally, the system control unit 115 may include the charging control unit 111 for controlling charging and discharging of the BESS 113. The charging control unit 111 controls charging and discharging of the BESS 113. When the system 109 or the load 117 is overloaded, the charging control unit 111 allows the BESS 113 to supply power and deliver it to the system 109 or the load 117. When the system 109 or the load 117 is lightly loaded, the charging control unit 111 allows an external power supply source or the electricity generation device 101 to supply power and deliver it to the BESS 113.

Figure 2:
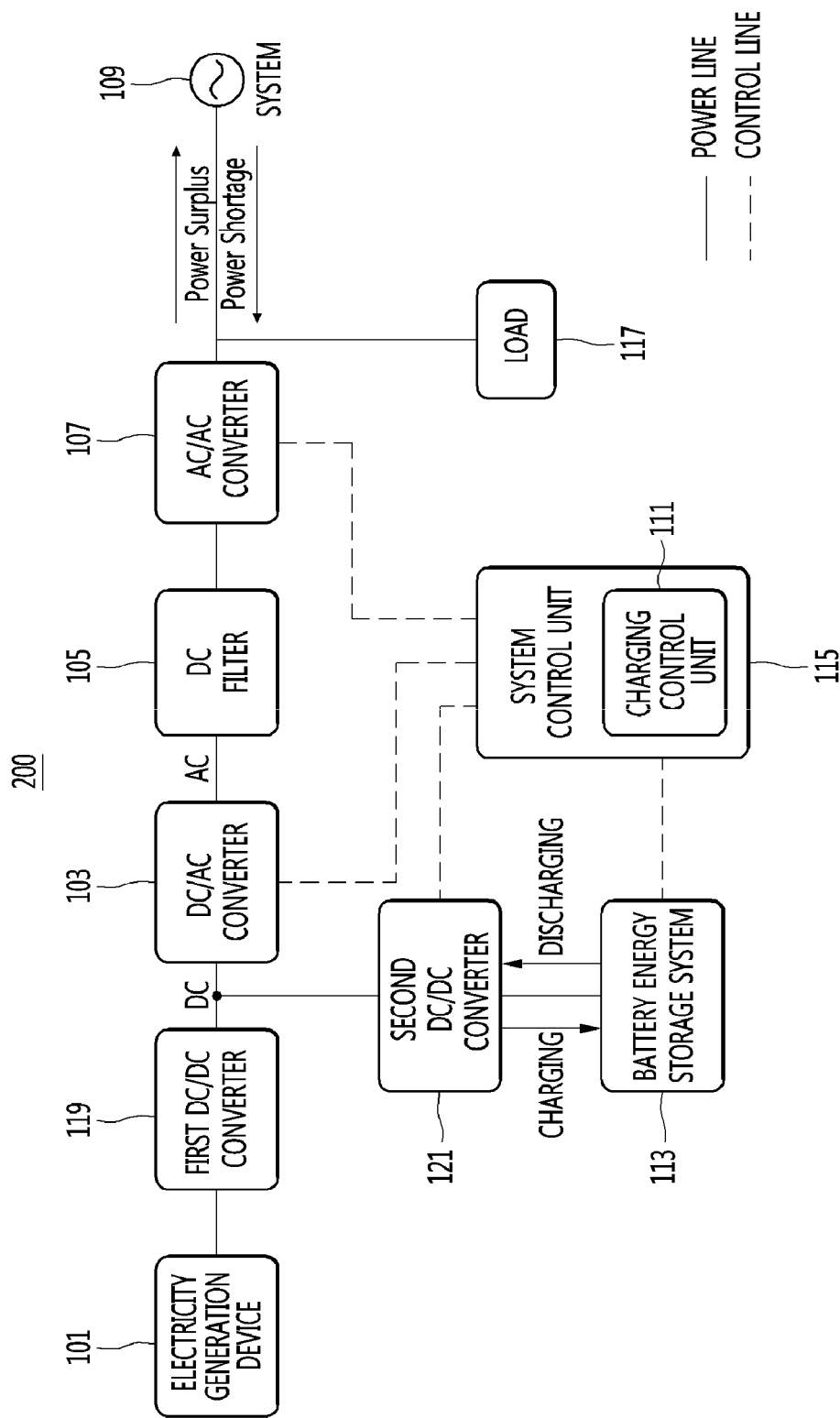
FIG. 2 is a block diagram illustrating a small-capacity power supply system according to an embodiment of the present invention.

FIG. 2 is a block diagram illustrating a small-capacity power supply system according to an embodiment of the present invention.

A small-capacity power supply system 200 according to an embodiment of the present invention includes an electricity generation device 101, a DC/AC converter 103, an AC filter 105, an AC/AC converter 107, a system 109, a charging control unit 111, a BESS 113, a system control unit 115, a first DC/DC converter 119, a load 117, and a second DC/DC converter 121.

This is identical to the embodiment of FIG. 1 but further includes the first DC/DC converter 119. The DC/DC converter 119 converts the voltage of DC power generated by the electricity generation device 101. In relation to the small-capacity power supply system 200, the voltage of the power generated by the electricity generation device 101 is small. Accordingly, it is necessary to boost the voltage in order to input the power supplied by the electricity generation device 101 into the DC/AC converter 103. The first DC/DC converter 119 converts the voltage size of the power generated by the electricity generation device 101 into the voltage size to be inputted to the DC/AC converter 103.

Figure 3:
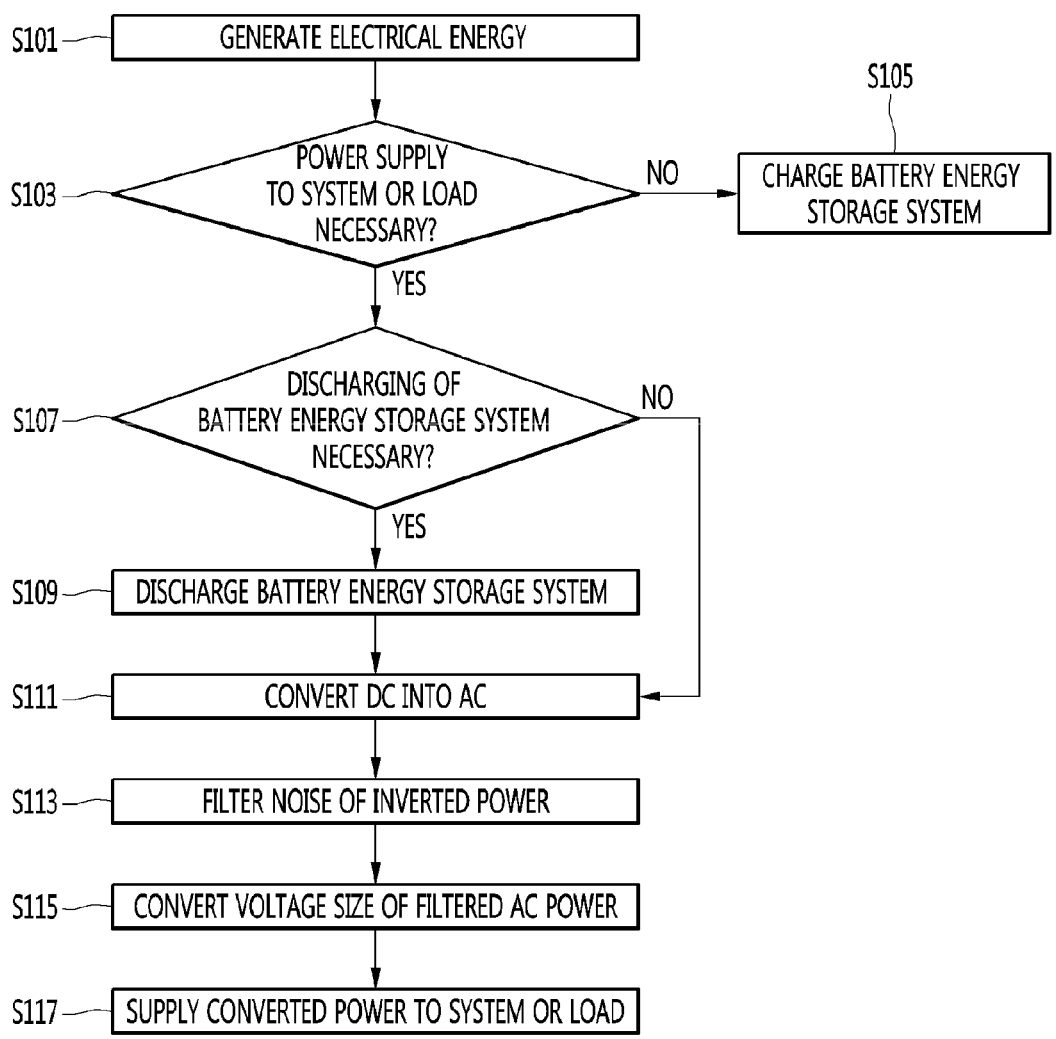
FIG. 3 is an operation flowchart of a power supply system according to an embodiment of the present invention.

FIG. 3 is an operation flowchart of a power supply system including an electricity generation device according to an embodiment of the present invention.

The electricity generation device 101 generates electrical energy in operation S101. According to a specific embodiment of the present invention, when the electricity generation device 101 is a solar cell array, it converts solar energy into electrical energy. According to a specific embodiment of the present invention, when the electricity generation device 101 is a fan, it converts wind power energy into electrical energy.

The charging control unit 111 determines whether power supply is required for the system 109 or the load 117 in operation S103. Whether power supply is required for the system 109 or the load 117 may be determined on the base of whether the system 109 or the load 117 is overloaded or lightly overloaded.

If power supply is not required for the system 109 or the load 117, the charging control unit 111 charges the BESS 113 in operation S105.

The charging control unit 111 determines whether discharging of the BESS 113 is required in operation S107. As the power demand of the system 109 or the load 117 is not satisfied with only the electrical energy supplied by the electricity generation device 101, whether discharging of the BESS 113 is required is determined. Additionally, the charging control unit 111 may determine whether the BESS 113 stores electrical energy sufficient for discharging.

If discharging of the BESS 113 is required, the charging control unit 111 discharges the BESS 113 in operation S109.

The DC/AC converter 103 converts electrical energy discharged by the BESS 113 and electrical energy generated by the electricity generation device 101 into AC in operation S111. At this point, the power supply system 100 converts all of electrical energy discharged by the BESS 113 and electrical energy generated by the electricity generation device 101 from DC to AC through one DC/AC converter 103. Each electric appliance has a limitation in using power. This limitation includes an instantaneous limitation and a limitation in the use for a long time and a rated power is defined by the maximum power that is used easily without damaging a device even in the use for a long time. In order to maximize the efficiency of the DC/AC converter 103, the BESS 113 and the electricity generation device 101 are required to supply power so that the DC/AC converter 103 uses 70% to 90% of such a rated power.

The AC filter 105 filters the noise of power converted into AC in operation S113. As described above, according to a specific embodiment of the present invention, a noise filtering operation may be omitted.

The AC/AC converter 107 converts the voltage size of the filtered AC power and supplies power to the system 109 or the load 117 in operation S115. As described above, according to a specific embodiment of the present invention, converting by the AC/AC converter 107 may be omitted.

The power supply system 100 supplies the converted power to the system 109 or the load 117 in operation S117.

Figure 4:
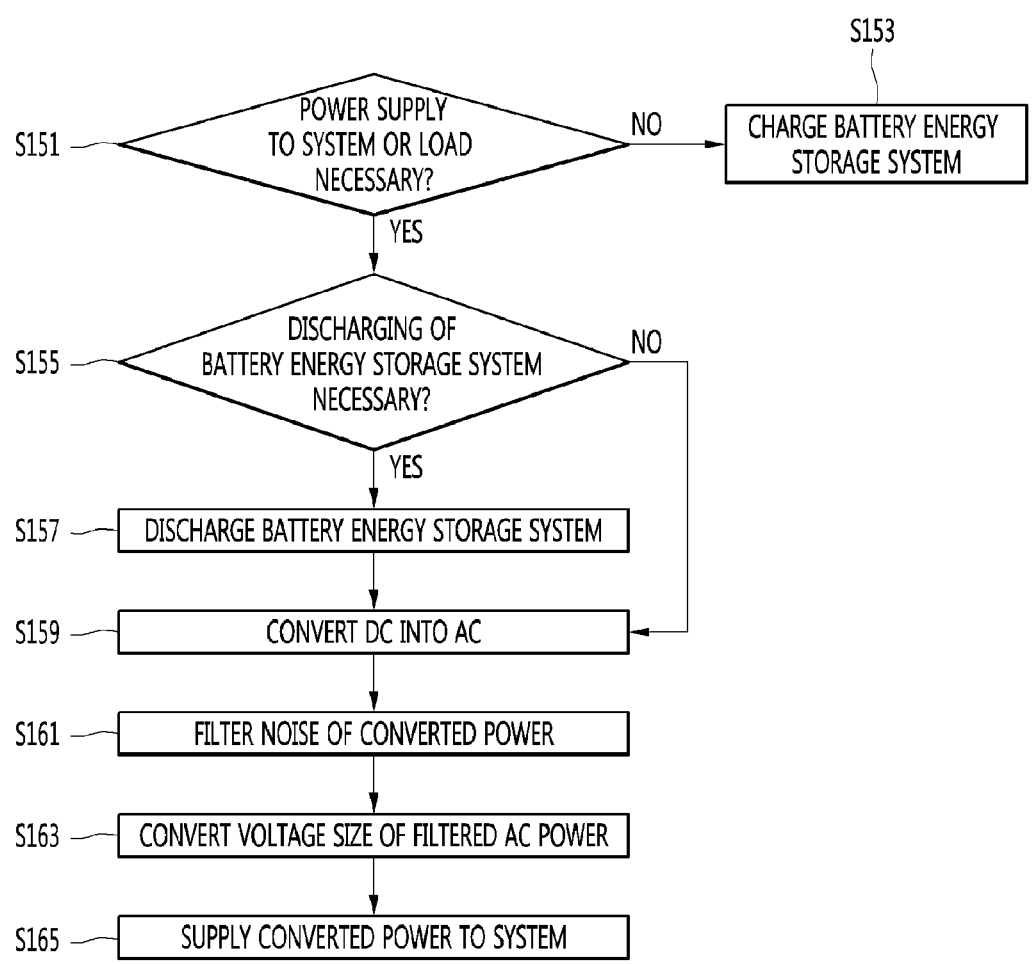
FIG. 4 is an operation flowchart of a power supply system not including an electricity generation device according to an embodiment of the present invention.

FIG. 4 is an operation flowchart of a power supply system not including an electricity generation device according to an embodiment of the present invention.

The charging control unit 111 determines whether power supply is required for the system 109 or the load 117 in operation S151. Whether power supply is required for the system 109 or the load 117 may be determined on the base of whether the system 109 or the load 117 is overloaded or lightly overloaded.

If power supply is not required for the system 109 or the load 117, the charging control unit 111 allows the power supplied from an external power supply source to charge the BESS 113 in operation S153.

The charging control unit 111 determines whether discharging of the BESS 113 is required in operation S155. The charging control unit 111 may determine whether the BESS 113 stores electrical energy sufficient for discharging.

If discharging of the BESS 113 is required, the charging control unit 111 discharges the BESS 113 in operation S157.

The DC/AC converter 103 converts DC of electrical energy discharged by the BESS 113 and electrical energy generated by the electricity generation device 101 into AC in operation S159.

The AC filter 105 filters the noise of power converted into AC in operation S161. As described above, according to a specific embodiment of the present invention, a noise filtering operation may be omitted.

The AC/AC converter 107 converts the voltage size of the filtered AC power and supplies power to the system 109 or the load 117 in operation S163. As described above, according to a specific embodiment of the present invention, converting by the AC/AC converter 107 may be omitted.

The power supply system 100 supplies the converted power to the system 109 or the load 117 in operation S165.

The BESS 113 may include a plurality of modules connected in series. In detail, the BESS 113 includes a plurality of battery racks connected in parallel and the plurality of battery racks may include a plurality of modules connected in series. According to a specific embodiment of the present invention, the power supply system 100 including the DC/AC converter 103 of 700 V to 1000 V may include seventeen modules each having a 50 V capacity. Additionally, each of the plurality of modules may include a plurality of cells. At this point, as shown in FIGS. 3 and 4, when charging and discharging are performed repeatedly, charging states of a plurality of modules may become different. The reason is that current may be constant but each module specific voltage may be different during series connection. Additionally, due to an external environment factor, charging states of a plurality of modules may be different. Charging and discharging of battery storage device may be less efficient. Additionally, when charging states of a plurality of cells included in each of the plurality of modules are not constant, the life cycle of the BESS 113 may be decreased. Accordingly, it is necessary to efficiently manage charging states of a plurality of modules of a BESS or a plurality of cells included in each of the plurality of modules. If charging states of a plurality of modules or a plurality of cells included in each of the plurality of modules are not constant, a module or cell having a high charging amount may be alternatively discharged through resistors connected to the plurality of modules or the plurality of cells included in each of the plurality of modules. However, this is inefficient because charging states of a plurality of cells are constant by consuming an unnecessary energy. Additionally, a cell having a high charging amount supplies DC to a cell having a low charging amount to charge it by connecting a plurality of modules or a plurality of cells and a DC/DC converter. In this case, unnecessary energy consumption may be prevented. However, connection relationship with a plurality of modules or a plurality of cells may become complex. Accordingly, a BESS management method for solving such an issue is required. This will be described with reference to FIGS. 5 and 6.

Figure 5:
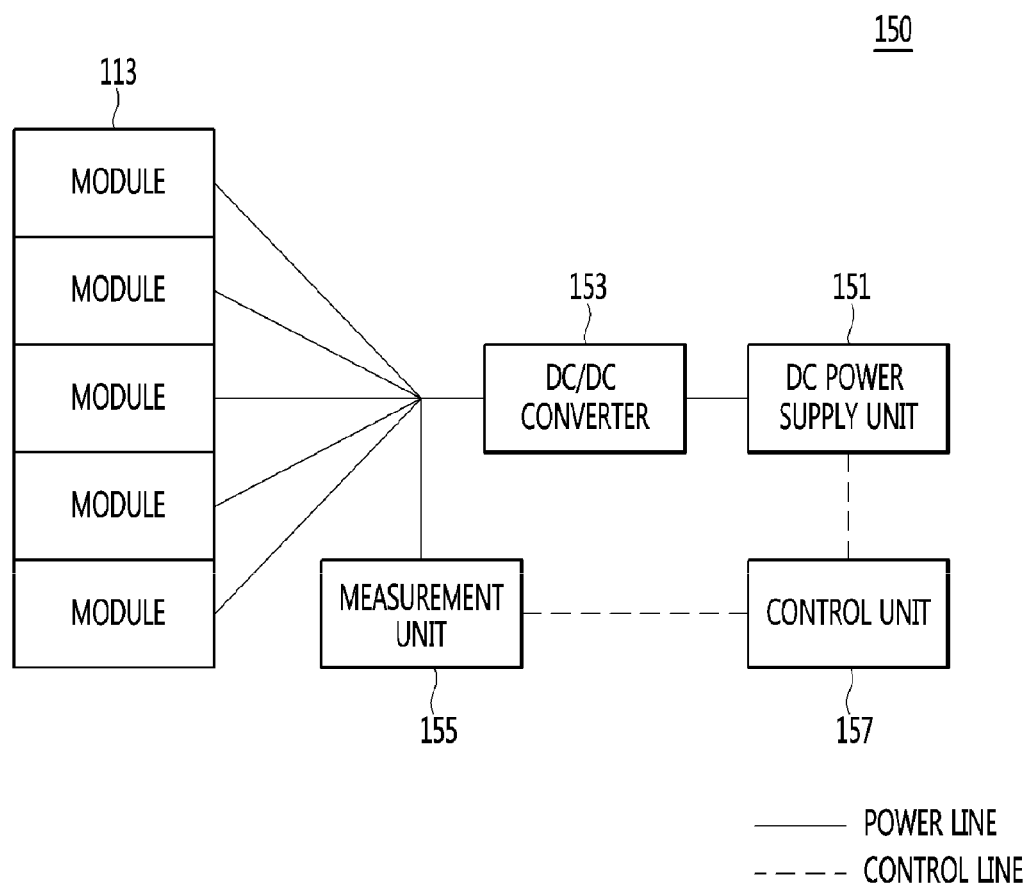
FIG. 5 is a block diagram illustrating a BESS management device of a power supply system according to an embodiment of the present invention.

FIG. 5 is a block diagram illustrating a BESS management device of a power supply system according to an embodiment of the present invention.

A BESS management device 150 for managing a BESS 113 includes a DC power supply unit 151, a DC/DC converter 153, a measurement unit 155, and a control unit 157.

The BESS 113, as described above, includes a plurality of modules connected in series. Each of the plurality of modules includes a plurality of cells connected in series.

The DC power supply unit 151 supplies DC power to the BESS 113. Additionally, the DC power supply unit 151 may supply DC power for driving at least one of the DC/AC converter 103, the system control unit 115, the AC filter 105, and the AC/AC converter 107 of the power supply system 100. In more detail, the DC power supply unit 151 may be a Switching Mode Power Supply (SMPS). Especially, the SMPS may often supply a voltage capacity similar to that of a module. At this point, the DC power supply unit 151 may supply DC power to the BESS 113 when the power supply system 100 does not operate. According to another specific embodiment of the present invention, the DC power supply unit 151 may be an Uninterruptible Power Supply (UPS) for preparing for power supply interruption during power outage. When using a DC power supply device for supplying DC power for operations of a configuration of the power supply system 100 or an UPS for preparing for an operation interruption of the power supply system 100 during power outage, it is unnecessary to additionally install a separate DC power supply device.

The DC/DC converter 153 converts the size of DC power and supplies it to the BESS 113.

The measurement unit 155 may measure a state of charge (SOC) of the BESS 113. In more detail, the measurement unit 155 may measure SOCs of a plurality of modules included in the BESS 113 or a plurality of cells included in each of the plurality of modules. In more detail, the measurement unit 155 may measure at least one of voltages and currents of a plurality of modules included in the BESS 113 or a plurality of cells included in each of the plurality of modules. The measurement unit 155 may include a voltage measurement unit for measuring a voltage of each of the plurality of modules. The measurement unit 155 may include a voltage measurement unit for measuring a voltage of each of a plurality of cells included in each of the plurality of modules. The measurement unit 155 may include a current measurement unit for measuring a current of each of the plurality of modules. The measurement unit 155 may include a current measurement unit for measuring a current of each of a plurality of cells included in each of the plurality of modules.

The control unit 157 controls operations of the DC power supply unit 151, the DC/DC converter 153, and the measurement unit 155. In more detail, the control unit 157 may be the system control unit 115 for controlling operations of a configuration included in the entire power supply system 100.

The control unit 157 may allow the DC poser supply unit 151 to supply DC power when a SOC of one of a plurality of modules or one of a plurality of cells has a difference of more than a reference range with respect to a SOC of another module or another cell. Herein, the SOC may be voltage or current.

If it is described in detail for one example of power supply of the DC power supply unit 151, the DC power supply unit 151 may supply DC power when a SOC of one of a plurality of modules has a difference of more than a reference range (for example, 1%) with respect to a SOC of another module.

If it is described in detail for another example of power supply of the DC power supply unit 151, when a SOC of one of a plurality of cells in one of a plurality of modules has a difference of more than a reference range (for example, 1%) with respect to a SOC of another cell, the DC power supply unit 151 may supply DC power.

Operations of the BESS management device 150 for managing the BESS 113 will be described with reference to FIG. 6.

Figure 6:
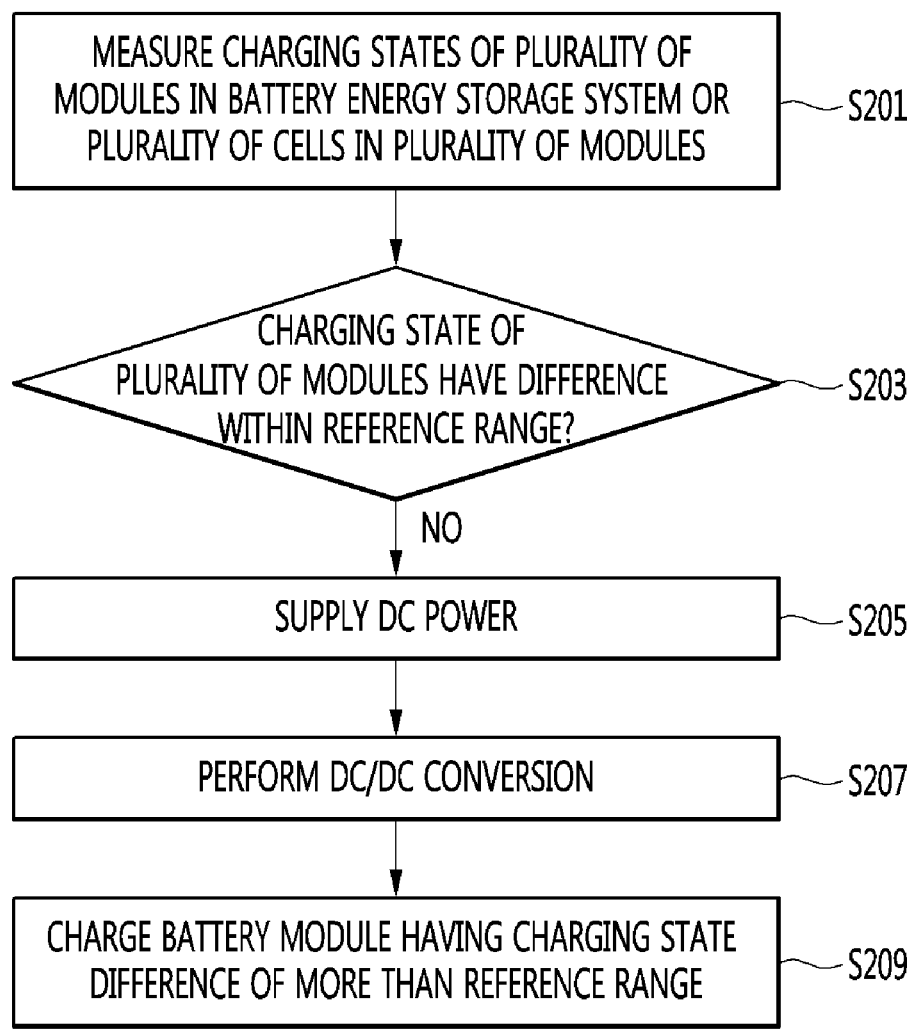
FIG. 6 is an operation flowchart of a BESS management device in a power supply system according to an embodiment of the present invention.

FIG. 6 is an operation flowchart of a BESS management device in a power supply system according to an embodiment of the present invention.

The measurement unit 155 measures SOCs of a plurality of modules included in the BESS 100 or a plurality of cells included in each of the plurality of modules in operation S201.

It is determined in operation S203 whether SOCs of a plurality of modules or a plurality of cells included in each of the plurality of modules are within a reference range. In more detail, the measurement unit 155 may measure whether one of a plurality of modules included in the BESS 100 or a plurality of cells included in each of the plurality of modules shows a voltage difference of more than a reference range size with respect to a plurality of other modules or a plurality of cells or a plurality of cells included in each of the plurality of modules. Additionally, the measurement unit 155 may measure whether one of a plurality of modules included in the BESS 100 or a plurality of cells included in each of the plurality of modules shows a current difference of more than a reference range size with respect to another module or another cell. For example, when a reference range is 1% of the total capacity of a module or a cell, the measurement unit 155 may measure whether a voltage of the first cell and the second cell is different more than 1% of the total capacity.

When SOCs of a plurality of modules or a plurality of cells included in each of the plurality of modules are out of the reference range, the DC power supply unit 151 supplies DC power in operation S205. As described above, the DC power supply unit 151 may be a DC supply device for supplying DC power to a configuration in the power supply system 100. According to a specific embodiment of the present invention, the DC power supply unit 151 may supply DC power when the power supply system 100 does not operate. For example, when the power supply system 100 is a photovoltaic device, the DC power supply unit 151 may supply DC power when the electricity generation device 101 does not generate power due to low solar radiation and the load 107 or the system 109 does not require power. Additionally, the DC power supply unit 151 may be a UPS for preventing an operation of the power supply system 100 from being interrupted during outage. According to a specific embodiment of the present invention, DC power may be supplied at a predetermined time interval. Additionally, when the power supply system 100 is a photovoltaic device, the DC power supply unit 151 may supply DC based on the sunrise time and the sunset time. Additionally, the DC power supply unit 151 may supply DC power based on a power amount necessary for a load or a system. Additionally, the DC power supply unit 151 may supply DC power when additional DC power is not required because a load or a system is lightly loaded. According to a specific embodiment of the present invention, when a UPS operation due to outage is not required, the DC power supply unit 151 may supply DC power.

The DC/DC converter 153 converts the size of DC power in operation S207. In more detail, the DC/DC converter 153 may convert the size of DC power into a size for charging a module or a cell. If the DC power supply unit 151 supplies DC power with a size for charging a module or a cell, the above operation may be omitted.

The BESS 113 charges a module or a cell showing a SOC difference with respect to another module or cell in operation S209. At this point, a module or a cell may be charged until it has a difference of a reference range with respect to a SOC of another module or cell. At this point, since DC power is supplied from the DC power supply unit 151, the BESS 113 may simultaneously charge a plurality of modules or a plurality of cells. Through the above embodiments, it is described that the BESS management device 150 measures a SOC by a cell unit or a module unit and performs charging. According to a specific embodiment of the present invention, the BESS management device 150 may measure a SOC of a battery rack including a plurality of modules and perform charging by a battery rack unit.

Through this, a plurality of modules included in the BESS 100 or a plurality of cells included in each of the plurality of modules may be managed efficiently. Additionally, it is possible to extend the life cycle of the BESS 113. Especially, if a SOC is managed by a module unit in the BESS 113, SOC measurement or connection for individual charging may be simple in comparison to SOC management by a cell unit.

A power supply system for improving power conversion efficiency may be provided by managing a BESS in the power supply system.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A Battery Energy Storage System (BESS) management device for managing a BESS for receiving and charging electrical energy and supplying the electrical energy to a DC/AC converter by discharging the charged electrical energy in a power supply system, the BESS management device comprising:
    a measurement unit configured to measure State of Charges (SOCs) of a plurality of series-connected modules or cells in the BESS; and
    a DC power supply unit configured to supply DC power to one of the plurality of modules or one of the plurality of cells on the basis of the SOCs of the plurality of modules or cells,
    wherein the DC power supply unit is an uninterruptible power supply for preventing an operation interruption of the power supply system during outage.

2. The BESS management device of claim 1, wherein the DC power supply unit supplies DC power for operations of a configuration of the power supply system.

3. The BESS management device of claim 2, wherein the DC power supply unit supplies DC power to one of the plurality of modules or one of the plurality of cells when the power supply system does not operate.

4. The BESS management device of claim 3, wherein the DC power supply unit is a Switching Mode Power Supply (SMPS).

5. The BESS management device of claim 1, wherein the DC power supply unit supplies DC power when a SOC of one of the plurality of modules or one of the plurality of cells shows a difference of more than a reference range with respect to a SOC of another module or another cell.

6. The BESS management device of claim 5, wherein the measurement unit comprises a voltage measurement unit for measuring a voltage of the plurality of cells or the plurality of modules.

7. The BESS management device of claim 5, wherein the measurement unit comprises a current measurement unit for measuring a current of the plurality of cells or the plurality of modules.

8. The BESS management device of claim 1, further comprising a DC/DC converter installed between the DC power supply unit and the BESS to convert a size of DC power supplied from the DC power supply unit.

9. The BESS management device of claim 8, wherein the DC/DC converter supplies the size converted DC power to the BESS.

10. A Battery Energy Storage System (BESS) management method for management of a BESS for receiving and charging electrical energy and discharging the charged electrical energy in a power supply system, the BESS management device comprising:
    measuring State of Charges (SOCs) of a plurality of series-connected modules or cells in the BESS; and
    supplying DC power to one of the plurality of modules or one of the plurality of cells on the basis of the SOCs of the plurality of modules or cells,
    wherein the step of supplying the DC power comprises supplying the DC power by an uninterruptible power supply for preventing an operation interruption of the power supply system during outage.

11. The method of claim 10, wherein the supplying of the DC power comprises supplying DC power for operations of a configuration of the power supply system.

12. The method of claim 11, wherein the supplying of the DC power comprises supplying DC power to one of the plurality of modules or one of the plurality of cells when the power supply system does not operate.

13. The method of claim 12, wherein the supplying of the DC power comprises supplying DC power by a Switching Mode Power Supply (SMPS).

14. The method of claim 10, wherein the supplying of the DC power comprises supplying DC power when a State of Charge (SOC) of one of the plurality of modules or one of the plurality of cells shows a difference of more than a reference range with respect to a SOC of another module or another cell.

15. The method of claim 14, wherein the measuring of the SOCs comprises measuring a voltage of the plurality of cells or the plurality of modules.

16. The method of claim 14, wherein the measuring of the SOCs comprises measuring a current of the plurality of cells or the plurality of modules.

17. The method of claim 10, further comprising supplying a size converted DC power to the BESS by a DC/DC converter for converting a size of a DC power supplied from the DC power supply unit.

* * * * *